(12) United States Patent
Titmuss et al.

(10) Patent No.: US 7,882,207 B1
(45) Date of Patent: Feb. 1, 2011

(54) MOBILE COMMUNICATIONS NETWORK FOR PERFORMING DATA ROUTING TO A MOBILE TERMINAL BY A HOME AGENT

(75) Inventors: Richard J Titmuss, Ipswich (GB); Caroline Am Lebre, Ipswich (GB); James L Taylor, Epone (FR)

(73) Assignee: British Telecommunications public limited company, London (GB)

( * ) Notice: Subject to any disclaimer, the term of this patent is extended or adjusted under 35 U.S.C. 154(b) by 993 days.

(21) Appl. No.: 09/868,221

(22) PCT Filed: Jan. 7, 2000

(86) PCT No.: PCT/GB00/00048

§ 371 (c)(1),
(2), (4) Date: Jun. 15, 2001

(87) PCT Pub. No.: WO00/42755

PCT Pub. Date: Jul. 20, 2000

(30) Foreign Application Priority Data

Jan. 15, 1999 (GB) .................................. 9900970.6

(51) Int. Cl.
*G06F 15/16* (2006.01)
(52) U.S. Cl. ...................... 709/223; 709/217; 709/218; 709/219; 709/227; 709/231; 709/246
(58) Field of Classification Search .................. 709/227, 709/231, 246, 217, 218, 219, 223
See application file for complete search history.

(56) References Cited

U.S. PATENT DOCUMENTS

| | | | | |
|---|---|---|---|---|
| 5,727,159 A * | 3/1998 | Kikinis | ........................ | 709/246 |
| 6,243,758 B1 * | 6/2001 | Okanoue | ..................... | 709/238 |
| 6,484,211 B2 * | 11/2002 | Turunen | ..................... | 709/245 |
| 6,535,493 B1 * | 3/2003 | Lee et al. | ..................... | 370/329 |
| 6,553,410 B2 * | 4/2003 | Kikinis | ....................... | 709/218 |
| 6,571,289 B1 * | 5/2003 | Montenegro | ................ | 709/227 |
| 6,587,882 B1 * | 7/2003 | Inoue et al. | .................. | 709/227 |
| 6,697,354 B1 * | 2/2004 | Borella et al. | ............... | 370/352 |
| 6,760,444 B1 * | 7/2004 | Leung | ......................... | 380/270 |
| 6,763,007 B1 * | 7/2004 | La Porta et al. | ............. | 370/331 |
| 2001/0041571 A1 * | 11/2001 | Yuan | .......................... | 455/445 |

OTHER PUBLICATIONS

Zhao et al., "Flexible Network Support for Mobility", ACM/IEEE, Proceedings of the Mobile Computing and Networking (MobiCom), p. 145-156, Dallas, TX; Oct. 1998.*
RFC 2002: "IP Mobility Support" (Perkins, IBM, Oct. 1996).*
Cheshire et al., "Internet Mobility 4×4", Proceedings of SIGCOMM, 1996.*

* cited by examiner

*Primary Examiner*—Djenane M Bayard
(74) *Attorney, Agent, or Firm*—Nixon & Vanderhye P.C.

(57) ABSTRACT

A method of transmitting one or more data streams to a mobile terminal having multiple network connections, the method comprising: sending the one or more data streams from a correspondent host to a home agent located in the home network of the mobile terminal, the mobile terminal sending a request for the data stream to be transmitted by the correspondent host and the mobile terminal communicating with the home agent to transmit the network location of the mobile terminal to the home agent, and then forwarding the one or more data streams via the foreign agent to the mobile terminal. The mobile terminal communicates network connectivity data to the home agent and the forwarding of the one or more data streams is dependent upon the network connectivity data received by the home agent.

14 Claims, 11 Drawing Sheets

Fig. 10.
Handover between GSM and Ethernet (HA)

Fig. 11.
Handover between GSM and Ethernet (MA)

Fig.12.
Handover between GSM and Breezenet (HA)

Fig.13.
Handover between GSM and Breezenet (MH)

MOBILE COMMUNICATIONS NETWORK FOR PERFORMING DATA ROUTING TO A MOBILE TERMINAL BY A HOME AGENT

BACKGROUND

1. Technical Field

Exemplary embodiments of the present invention relate to communication networks that enable data transmission to mobile terminals and a method of transmitting data to such a mobile terminal.

2. Description of Related Art

Two recent growth trends in the fields of communications and information technology have been the use of mobile communications, especially mobile telephony, and the use of computer networks such as the internet to share and exchange data. These two trends are set to continue and also to converge. In 2000 the Universal Mobile Telecommunications System (UMTS) will be launched in Europe and this is intended to provide both fixed and cellular mobility across a single network infrastructure, supporting a full range of mobile communications capabilities from short messages, high quality speech to full interactive multi-media communications. Some of the challenges that must be addressed in order to realise UMTS are the provision of user terminals, wireless network infrastructures to provide the necessary bandwidth for mobile users and network flexibility to allow users to connect simultaneously to a number of networks (including both fixed and mobile networks) and for those network connections to be seamlessly dropped and added as a user moves out of, or into, the range of a network.

It is known (see 'Flexible Network Support for Mobility', X Zhao, C Castellucia & M Baker, MOBICOM 98, Dallas, Tex., pages 145-156) how to provide support for a mobile terminal using a number of wireless communication networks. Because of the mobility of the host, the network connectivity of the host, and hence its network address, will keep changing. Hosts communicating with the mobile terminal therefore send data to the mobile terminal's 'home' network address and this data is intercepted by a fixed host, called a home agent, which is connected to the 'home' network of the mobile terminal. The mobile terminal is in communication with the home agent so that the home agent is always aware of the network address of the mobile terminal (or network addresses if the mobile terminal is connected to more than one network), enabling the home agent to forward data packets for the mobile terminal to the mobile terminal. If the mobile terminal is connected to a number of networks and is receiving different types of data flow (e.g. file transfer, WWW (World Wide Web) downloads, voice, etc.) then the mobile terminal will inform the home agent of the different networks to which it is connected and also instruct the home agent which network to use for each different data flow.

According to a first aspect of the invention there is provided a method of transmitting one or more data streams to a mobile terminal having multiple network connections, the method comprising the steps of;

(i) sending the one or more data streams from a correspondent host to a home agent located in the home network of the mobile terminal, the mobile terminal sending a request for the data stream to be transmitted by the correspondent host and the mobile terminal communicating with the home agent to transmit the network location of the mobile terminal to the home agent; and (ii) forwarding the one or more data streams to the mobile terminal, characterised in that the mobile terminal communicates network connectivity data to the home agent and that the forwarding of the one or more data streams is dependent upon the network connectivity data received by the home agent.

One advantage of exemplary embodiments of the present invention is that the routing of the data to the mobile terminal is performed by the home agent rather than the mobile terminal, making the terminals less complex, which should lead to smaller, cheaper terminals which have lower power consumption.

A terminal has a network connection if it is in communication with a network, regardless of whether or not the terminal is transmitting or receiving data via the network connection.

Furthermore, in response to a change in the network connectivity data received by the home agent at least one of the data streams may be forwarded by the home agent to a network cache, said at least one data stream(s) being stored in the network cache until the home agent forwards said at least one data stream(s) to the mobile terminal. Requests sent by the mobile terminal to the correspondent host may be sent via the home agent. Additionally, all communication from the home agent to the mobile terminal and/or all communication from the mobile terminal to the home agent may be routed via a foreign agent, the foreign agent being located in a subnetwork to which the mobile terminal is connected. In response to a change in the network connectivity data received by the home agent the information content of at least one of the data streams may be reduced before being forwarded to the mobile terminal. The reduction of information content of the at least one of the data stream(s) may comprise the conversion from a first data format to a second data format having a lower resolution than the first data format. For example, this could be the conversion of a stereo audio signal to a mono audio signal, or a the conversion of a colour video signal to a black and white colour signal.

According to a second aspect of the invention there is provided a mobile communications terminal comprising an interface to a plurality of networks; means for transmitting and receiving data using some or all of the network interfaces; and control means operative to send messages concerning the availability of communications paths to the mobile terminal via at least one of said plurality of network interfaces. The terminal may have one interface which connects to a plurality of networks, for example a PCMCIA card which comprises GSM, PSTN and ISDN modems, or a number of interfaces which can each connect to one or more networks.

According to a third aspect of the invention there is provided a communications network comprising; a plurality of mobile communications subnetworks, some of said mobile communications subnetworks having overlapping geographical coverage; and control means operative such the mobile terminals can each be in simultaneous communication with more than one of the plurality of mobile communications subnetworks; characterised in that the control means receives network connectivity data from each mobile terminal and routes data streams to each mobile terminal on the basis of the received network connectivity data from that terminal.

According to a fourth aspect of the invention there is provided a Mobile IP extension comprising an Extension field and a Length field and characterised in that the Mobile IP extension further comprises a Network Type Field and a Care-of-Address field. There is also provided a Mobile IP registration packet, characterised in that the Mobile IP registration packet comprises one or more Mobile IP extension(s)

as described above. There is additionally provided a signal comprising a Mobile IP registration packet as described above.

An exemplary embodiment of the present invention also provides a communications system for effecting data transfer from a first computer, attached to a communications network, to a mobile communications terminal which has an allocated home address in the communications network and a home agent to manage communication between data sources in the communications network and the mobile terminal when the terminal is not at its home address, wherein; the mobile communication terminal is configured for simultaneous communication via a plurality of types of wireless communications channels; characterised in that the mobile terminal sends to its home agent information about the current availability of the different communications channels, the home agent selecting the appropriate communications channel in accordance with the type or characteristics of data to be communicated to the mobile terminal.

BRIEF DESCRIPTION OF THE DRAWINGS

Exemplary embodiments of the present invention will now be described with reference to the following Figures.

DETAILED DESCRIPTION OF NON-LIMITING EXEMPLARY EMBODIMENTS

Figure 1:
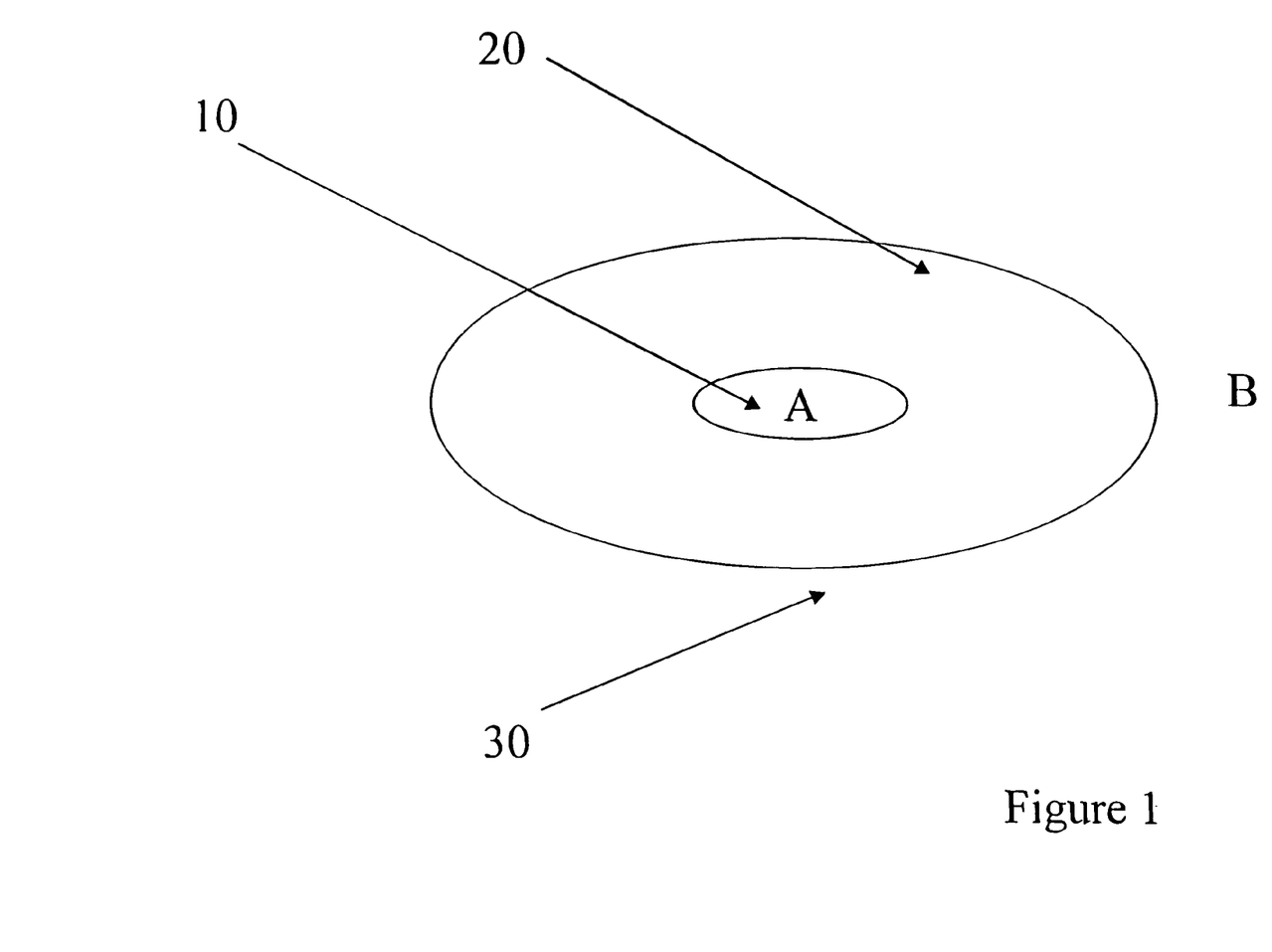
FIG. 1 shows a communications network formed from a number of wireless subnetworks.

FIG. 1 shows a tiered communications network comprising wireless communications networks 10, 20 & 30. Communications network 10 has the smallest geographical coverage, communications network 30 has the largest geographical coverage whilst communications network 20 has an intermediate geographical coverage. Thus a network user in location A may connect to any or all of communications networks 10, 20 or 30, whilst a network user in location B may only connect to network 30. In general, the available bandwidth of such a communication network is inversely related to the geographical coverage of the communication network.

Figure 2:
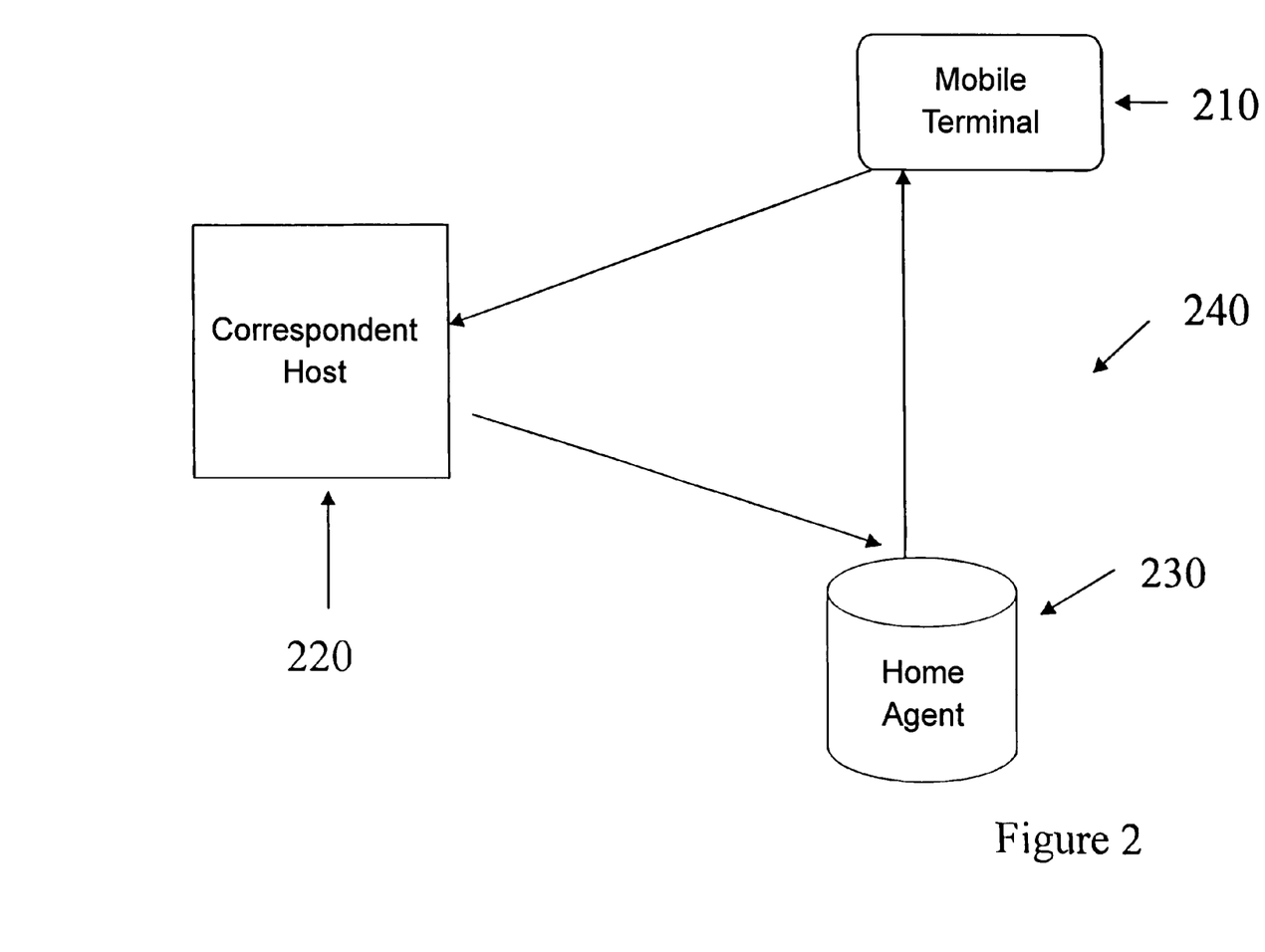
FIG. 2 shows schematically triangular routing using the Mobile Internet Protocol.

FIG. 2 shows a schematic depiction of how data can be transmitted to a mobile network host. The mobile terminal 210, correspondent host 220 and a home agent 230 are all interconnected by a communications network 240, which is formed from a number of smaller communication subnetworks (the communications network may be formed from a number of different transmission networks, as is shown in FIG. 1, and may also include fixed networks as well as wireless networks). The mobile terminal 210, which is connected to the network 240 via a wireless connection (or a fixed connection if one is available in the location of the mobile user) sends a request to the correspondent host 220, for example a request to transfer a file using ftp, or to download a WWW page. Because the mobile user will be moving between different subnetworks and hence its network address will keep changing, it is advantageous to use a defined home network address for the correspondent host to respond to. The correspondent host responds to the request of the mobile terminal by transmitting a data stream to the home network address of the mobile terminal and a home agent which is located with the home subnetwork of the mobile terminal receives the data stream and forwards the data stream to the mobile user. When the mobile terminal leaves its home subnetwork and then connects to a further subnetwork, it must inform the home agent of its new network address so that the home agent knows where to forward the data stream to. Each time that the mobile user connects to a different subnetwork, it must forward its new network address to the home agent so that the home agent can perform the necessary forwarding of data.

Figure 3:
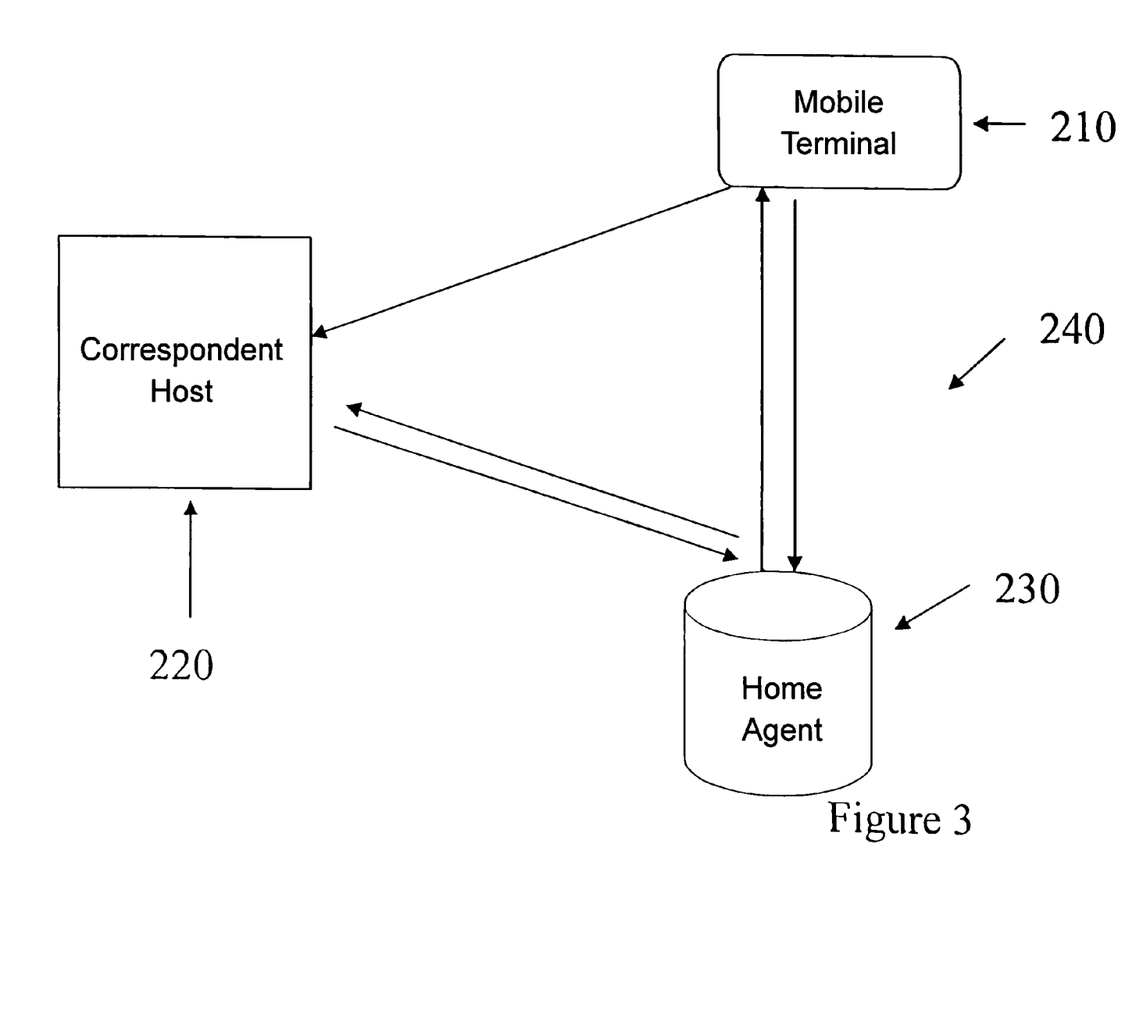
FIG. 3 shows schematically bi-directional routing using the Mobile Internet Protocol.

As an alternative to the above method, the mobile user request may be sent to the correspondent host via the home agent (as shown in FIG. 3) with the response of the correspondent host still being sent to the mobile terminal via the home agent. This bi-directional routing is required so that the request of the mobile terminal comes from the home address of the mobile terminal, which may be necessary in order to pass through firewalls or to prevent routers rejecting data packets as the routing from the mobile terminal to the correspondent host might be inconsistent with the network address of the home agent.

Figure 4:
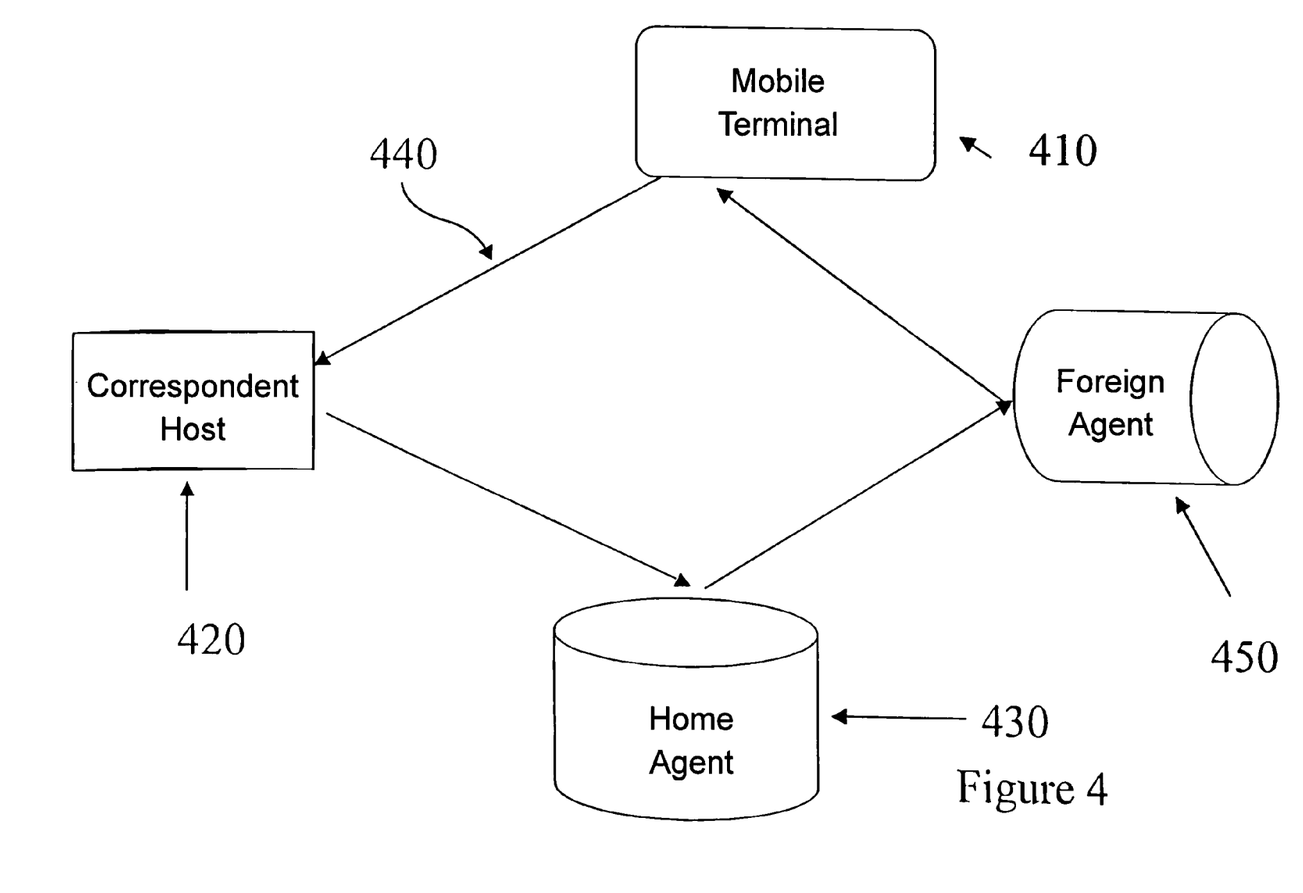
FIG. 4 shows schematically routing using a foreign agent with the Mobile Internet Protocol.

As a further alternative to the routing schemes discussed above, it is also known to use a foreign agent. FIG. 4 shows a mobile terminal 410, correspondent host 420, a home agent 430 and a foreign agent 450 are all interconnected by a communications network 440. The foreign agent is aware of all mobile terminals which are connected to its subnetwork. The mobile terminal need only inform the home agent of the subnetwork to which it is connected and then the home agent can forward data streams to the foreign agent for that subnetwork and the foreign agent will then forward the data streams to the mobile terminal. It is also possible to perform bi-directional routing using the foreign router.

Typically, communication devices are connected to only one type of network. The universal interconnection of land-based communications networks (i.e. cable, fibre and copper networks forming the vast majority of current telecommunications networks and the Internet) provides global communications links to any fixed system. Gateways from mobile networks, such as GSM, to fixed networks extend this global connectivity to mobile terminals. Specific components of the mobile network deal with terminal identification and authentication for registration with the network and management of the terminal's location as it moves, and other aspects of the network manage the re-routing of traffic as the terminal passes from one coverage area to another during the course of the same connection or session. The re-routing mechanisms are called handover mechanisms and are a key part of a mobile network architecture. In this situation the mobile terminal has a fixed point of attachment to the communication network, and therefore a fixed network address, and it uses the handover support provided by the mobile network. This approach is used today for wide-area, low-bandwidth networks, e.g. GSM or packet radio, or for high bandwidth local area networks, e.g. wireless LANs. Mobile IP, which is an extension to the Internet Protocol that is at the heart of the Internet, can be used to enable mobile terminal mobility around the Internet. This standard allows a mobile terminal to perform handover between an existing point of attachment and a new point of attachment to the Internet. All existing connections between the mobile terminal and other nodes are maintained during the handover process.

However, when considering the tiered network shown in FIG. 1, mobile terminals will need to have multiple network interfaces. Examples of such systems in mobile applications include dual to mode handsets (GSM/DECT) and portable computers with IrDA and Ethernet interfaces. The control software in such systems usually selects which network interface to use and directs all traffic via that interface but does not support handover of traffic between the different network interfaces. It is known to extend mobile IP so that these multi-mode terminals can use one or more of the network interfaces at the same time for different traffic flows and to provide handover between different network types.

Again, referring to FIG. 1, network 10 may be, for example, HIPERLAN, which provides links of up to 25 Mbit/s in a cell of up to 100 m diameter; network 20 may be, for example, DAB (Digital Audio Broadcast) which provides up to 1.7 Mbit/s over a region of 60 km diameter and network 30 might be a GSM network, providing 9.6 kbit/s over a national or continental area using a large number of cells. If a mobile terminal using HIPERLAN moves from one HIPERLAN cell to another, the HIPERLAN protocols will control the handover from one cell to the next (and similarly in movement between DAB regions and GSM cells). These handovers are referred to as horizontal handovers. Vertical handovers are when a data stream is switched from one network interface to another, e.g. from GSM to DAB, or from HIPERLAN to DAB.

Figure 5:
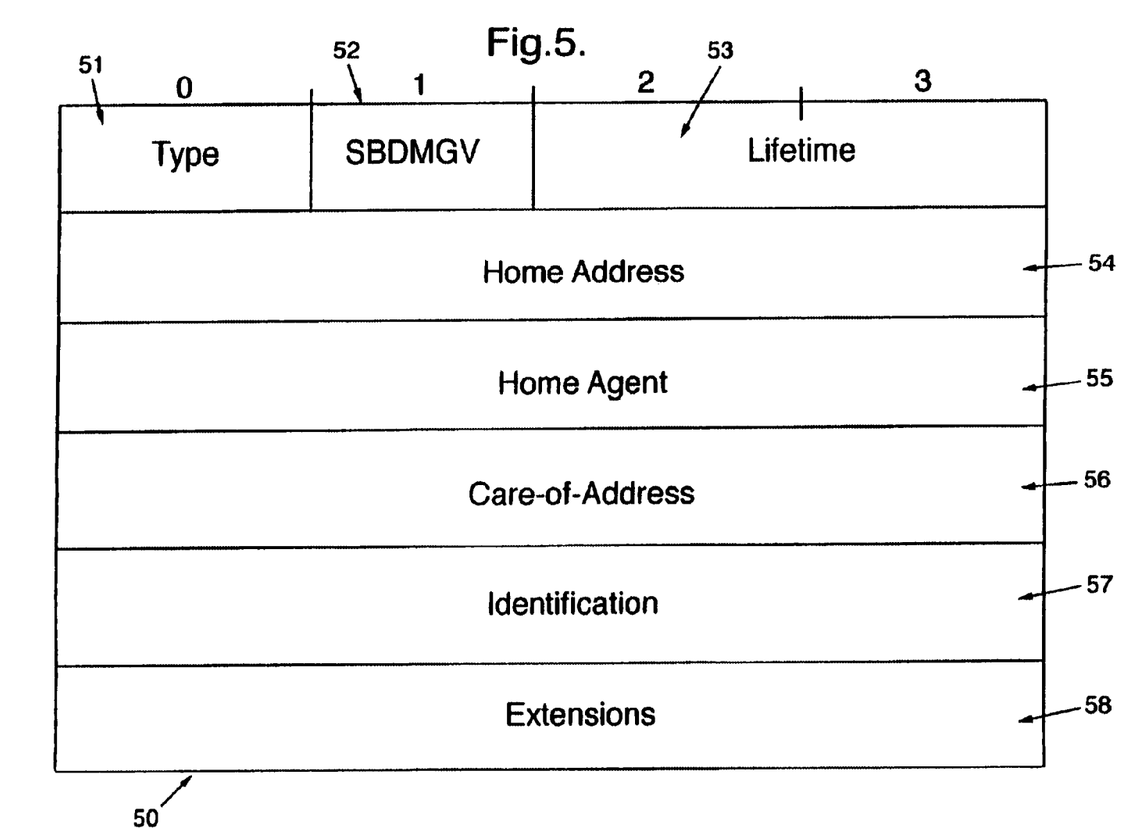
FIG. 5 shows the structure of the Mobile Internet Protocol registration packet.

In a non-mobile IP network, a node's point of attachment on the network is fixed. A unique IP address identifies the node and subnet to which it is attached. Packets of data are routed to the appropriate IP subnet based on the destination node IP subnet address. If a node moves to a new subnet, active connections, which must keep the same IP address association, will not have their packets routed to the new network point of attachment since their IP subnet address will refer to the old subnet and existing active connections will be broken. In contrast, when using mobile IP, when a mobile terminal attaches to a foreign network it acquires a care-of-address which identifies its current point of attachment to the Internet (although the following discussion refers to the Internet, the same methods and concepts can be applied to Intranets and other IP-based networks, as well as other connection-less communication networks). Depending on the foreign network that the mobile terminal connects to, the care-of-address may be the address of the foreign agent for that network or a local address obtained by the mobile terminal (e.g. using Dynamic Host Configuration Protocol (DHCP) {see R. Droms, "Dynamic Host Configuration Protocol", RFC 1531, IETF, October 1993, www.ietf.org.}). The care-of-address is registered by sending a Mobile IP registration packet (shown in FIG. 5) to the mobile terminal's home agent.

The Mobile IP registration packet 50 (shown in FIG. 5) contains a number of fields. For further details regarding Mobile IP, see RFC 2002, IP Mobility Support, C. Perkins, October 1996 (available from http://www.ietf.org). The numerals across the top of the packet (0, 1, 2, 3) indicate the size of each field in octets (groups of 8 bits). Field 51 (the Type field) occupies an octet of the packet and indicates the version of the Mobile IP protocol that is being used. Field 52 contains a number of flags, which if set, cause the home agent to respond to the Mobile IP registration packet in a particular manner. One of particular interest to exemplary embodiments of the present invention is the 'S' flag which, when set, causes the home agent to retain its prior mobility bindings (the other flags are described in RFC2002). The Lifetime field 53 contains the length, in seconds, for which the registration packet is valid. If the field is set to 0 it causes the previous registration packet from that mobile terminal to be cancelled by the home agent and if all the bits in the field are set to 1 (the field occupies two octets, i.e. 16 bits) an infinite lifetime is established (i.e. the registration packet remains valid until it is cancelled by a subsequent registration packet). The Home Address field 54 contains the home network address for the mobile terminal, the Home Agent field 55 contains the network address for the home agent and the Care-of-Address field 56 contains the care-of-address that is used when forwarding data to the newly established network creation. The Identification field 57 contains a numerical string generated by the mobile terminal when the registration packet is generated. This numerical string is returned to the mobile terminal by the home agent when the home agent is acknowledging receipt of the registration packet, so the registration packet can be paired with its acknowledgement. The Extensions field 58 may be used to extend the functionality of Mobile IP.

Figure 6:
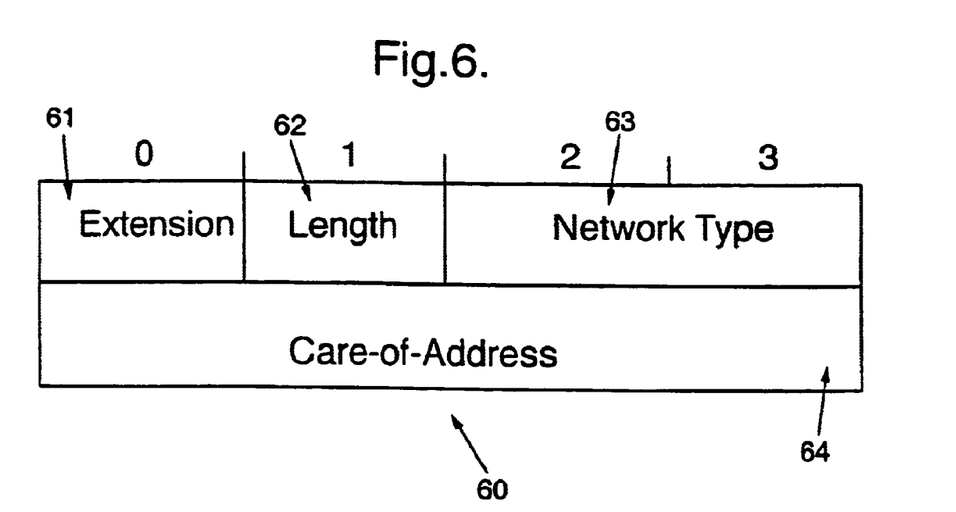
FIG. 6 shows the structure of an extension to the Mobile Internet Protocol registration packet.

The Registration packet allows one care-of-address to be registered for a mobile terminal. FIG. 6 shows the Mobile IP extension that is used in exemplary embodiments of the present invention, and one of these extensions is used for each network connection that is to be registered. The Extension field 61 is used to indicate the type of Mobile IP extension and the Length field 62 contains the length of the Mobile IP extension (in bits). Both the Extension field and the Length field are mandatory for Mobile IP extensions. The Network Type field 63 contains a string which indicates the network to which a connection has been made and the Care-of-Address field 64 contains the care-of-address applicable for that network. The use of one or more extensions 60 informs the home agent of all of the networks to which the mobile terminal is connected and the type of networks to which it is connected. The data in the Network Type field 63 may indicate network characteristics such as available bandwidth, latency, cost etc., or this data may be stored in the home agent and be retrieved by the home agent in response to the contents of the Network Type field 63.

On reception of the registration packet, the home agent creates a binding of the home address and each of the care-of-addresses that are valid for the given lifetime. When the mobile terminal makes a request, packets from the mobile terminal are routed directly to a corespondent host and contain the home address of the mobile terminal as the source address. Replies from the correspondent host are therefore routed to the home address on the home subnet and can be intercepted by the home agent. The home agent then forwards any packets for the mobile terminal by encapsulating them to the care-of-address stored in the binding table for that mobile terminal. All nodes, whether mobile or fixed, need to learn and cache a mobile terminal's binding in a binding table. When transmitting a packet to any destination, the node checks its cached bindings for the packet's destination address. If an entry is found, the node sends the packet directly to the care-of-address indicated in the binding. When the mobile terminal moves to a different foreign network it must send the new care-of-address to all the corespondent hosts it is communicating with. Using cache binding the routing is more efficient because packets are routed directly and not via the home agent.

The mobile IP protocol is capable of dealing with vertical handover but with limited support for multiple networks. In the registration packets the mobile terminal can specify multiple interfaces using the "S" (simultaneous binding) flag. In this situation the home agent will retain its prior mobility bindings for the mobile terminal and add the new binding to the list. Effectively, the home agent has multiple care of addresses for the mobile terminal but it will forward all packets to all the care-of-addresses. This technique can be used during handover between two different networks to help prevent packet loss but it is not practical when registering multiple active interface as packets would be forwarded to all of these interfaces, wasting bandwidth.

The mobile IP extension used in the present invention (FIG. 6) provides the home agent with details of all of the networks and care of addresses currently available to the mobile terminal. The extension provides simple information about the available network type and bandwidth available. Additionally, it may be extended to include more detailed information about the network such as current usage, cost per bit, latency or any other network characteristic.

As is stated in Mobile IP RFC 2002, when an extension numbered in the range 0 to 127 is encountered but not recognised, the packet containing the extension must be dropped. When an extension numbered in the range 128 to 255 is encountered which is not recognised, that particular extension is ignored, but the rest of the packet data can still be processed. For the mobile IP extension used in exemplary embodiments of the present invention, the registration packet contains one of the care of addresses available to the terminal that can be used by the home agent if the extension is not recognised. The extension number used must therefore be in the range 128 to 255 (at least with current systems).

The list of available networks and their types may be used for class type routing, multimedia conversion and information caching. Information from the IP header, such as the host's address and port number, may be used to categorise traffic roughly.

It will be readily understood that exemplary embodiments of the present invention may be implemented using software and that software suitable for carrying out the method of exemplary embodiments of the present invention may be supplied on conventional computer media, e.g. floppy disk, CD-ROM, DVD, etc., or over a computer or communications network. The vertical handover prototype system was implemented using Java and C on a Linux kernel (version 2.1). Java was preferred because it is suitable for rapid prototyping, however C was also required to interface with the operating system. Linux was chosen for the implementation of the system because it is one of the few operating systems with an advanced and flexible network layer, allowing for example multiple active interfaces on the terminal and multiple IP addresses associated to a single interface. Other operating systems (e.g. Windows 98, Windows NT, BeOS, etc.) and programming languages (e.g. C++, Visual Basic, etc.) may be used if they provide the required features and flexibility.

During initialisation, the mobile terminal determines which networks are available for connection. This information is sent to the home agent using the standard mobile IP registration packet with an extension according to an exemplary embodiments of the present invention for each available network. The "best" network may be selected by comparing the bandwidths and availability of all the networks and selecting the one with the highest bandwidth. Alternatively, the different classes of traffic may be transmitted via different types of transmission links depending on the most appropriate network available. When the network availability changes, the mobile terminal sends a new registration packet to the home agent and both the mobile terminal and home agent re-evaluate which network(s) to use for communication.

For example, if the mobile terminal is in range of both HIPERLAN and GSM, then HIPERLAN will be selected because it has a higher bandwidth. When the mobile terminal moves away from the HIPERLAN cell, a handover to GSM will be performed. In experiments carried out by the inventors, it has been possible to establish asymmetric links using the HIPERLAN network for the downlink and GSM for the uplink. Handovers have been successfully carried out between symmetric and asymmetric links.

Handover between the different network tiers can lead to very different quality of service being available to the mobile terminal, for example handover from a wireless LAN (2 Mbit/s) to GSM (9.6 kbit/s). This change in bandwidth may result in slower service or even a lack of service depending on the application. Some protocols, such as TCP, will not perform efficiently after a significant change in service quality.

Two different approaches can be taken to support the change of bandwidth. Firstly the applications used on the terminal can be written to support the varying quality of service. This has the disadvantage that "standard" applications cannot be used on the mobile terminals. The RealVideo and RealAudio applications (www.realnetworks.com) provide support for networks with different qualities of service. Each connection can supply data using different bandwidths depending on the network conditions. Unfortunately the available bandwidth is not dynamically assessed making these applications unsuitable for networks supporting vertical handover.

The second approach uses support for standard applications within the network using network proxies or packet filters. Within the network, automatic media conversion is used when insufficient bandwidth is available to support the service. For example when receiving "multimedia documents", on the lower quality networks automatic format conversion and stripping can decrease the download time with minimum loss of information. For example, audio streams can be converted from a stereo format to a mono format, video streams can be converted from colour to black and white, or a lower resolution may be used, etc. It is possible that no suitable network may be available for downloading a document, even after such downgrading has been performed, so in this case the network may cache the data ready for download when a suitable network becomes available. Within the Wireless Access Protocol (WAP), multimedia translation is supported, in this case primarily to support devices with more limited user interfaces (e.g. mobile phones).

Many of today's networked multimedia applications (including, for example, the World Wide Web) are asymmetric in nature. Typically bytes of information are sent as a request from the terminal and megabytes of data are received in response to the request. Existing mobile networks reserve the same amount of bandwidth for the uplink and downlink to the terminal and thus providing asymmetric services over mobile networks results in a waste of bandwidth. This is undesirable because of the limited amount of radio spectrum. Broadcast networks, both satellite and terrestrial, can be used to provide additional capacity for asymmetric services. This works most effectively with Class Based Routing where only appropriate traffic is routed via the broadcast network. Satellite networks are already used to supplement capacity in IP networks using the fixed telephone network for the uplink. Within a mobile context, handover between broadcast transmitters (i.e. horizontal handover) will be required as well as operation with different networks, one of which may be used as an uplink.

The TCP protocol is designed to provide reliable end to end data transfer over the Internet. A feature of TCP is its in-built algorithms used for congestion control, which limit the rate at which data is transmitted. Vertical handovers may lead to a very different quality of service available to the mobile terminal. Previous studies have looked at the performance of TCP/IP in wireless networks. Some wireless networks (for example Breezenet) do not guarantee delivery of packets. On these TCP interprets the packet loss as congestion, and it applies the congestion control mechanisms which are not desirable in this case. Possible solutions discussed are modifications to the TCP protocol (see A. Bakre, B. Badrinath, "Implementation and Performance Evaluation of Indirect TCP", IEEE Transactions on Computers, vol. 46, no. 3, March 1997) and using Selective Acknowledgements (SACK) (for various approaches see N. Samaraweera, G. Fairhurst, "Reinforcement of TCP Error Recovery for Wireless Communication", ACM, SIGCOMM, Computer Communication Review, Vol. 28, No 2, April 1998, H. Balakrishnan, S. Seshan, E. Amir, R. H. Katz, "Improving TCP/IP Performance over Wireless Networks", ACM Mobile Computing and Networking Conference, Oakland, Calif. November 1995, or R. Bruyeron, B. Hemon, L. Zhang, "Experimentations with TCP Selective Acknowledgement", ACM, SIGCOMM, Computer Communication review, Vol. 28, No 2, April 1998). Wireless links with guaranteed packet delivery (e.g. GSM) do not suffer from this problem.

TCP can send multiple segments (packets of data) without receiving an acknowledgement from the other end. Flow control is imposed by both the receiver to prevent buffer overflow, and the sender for congestion control. Two different algorithms, Slow Start and Congestion Avoidance, are used to avoid congestion in the Internet. These algorithms maintain two variables, the congestion window that limits the number of segments "in flight" in the network, and the slow start threshold that determines which algorithm is used. The algorithms are usually implemented together and are explained by Stevens (see "TCP/IP Illustrated", Volume 1, Richard Stevens, published by Addison-Wesley, in particular chapter 20 for the Slow Start algorithm and chapter 21 for the Congestion Avoidance algorithm) as follows:

1. Initialisation for a given connection sets the congestion window to one segment and the slow start threshold to 65535 bytes.
2. TCP never sends more than the minimum of the congestion window or the receiver's advertised window.
3. When congestion occurs (indicated by a timeout or the reception of duplicate ACKs), one-half of the current window size (the minimum of the congestion window and the receiver's advertised window, but at least two segments) is saved in the slow start threshold. If the congestion is indicated by a timeout the congestion window is set to one segment (this is slow start).
4. When the other end acknowledges new data, we increase the congestion window, but the way it increases depends on whether we're performing slow start or congestion avoidance.
5. If the congestion window is less than the slow start threshold we're in Slow Start; otherwise we're doing Congestion Avoidance. Slow Start increments by one segment every time an ACK is received. Congestion Avoidance dictates that the congestion window is increments by 1/congestion window each time an ACK is received. This increases the congestion window by at most one segment each round-trip time.

To clarify, when an acknowledgement is received from the other end the congestion window is increased. This allows the sender to transmit new data. In Slow Start the congestion window is increased exponentially, whereas in Congestion Avoidance the increase is linear. Slow Start is used at the beginning of a connection until a threshold where congestion occurred previously, at which time Congestion Avoidance is used. Two events can cause a packet to be retransmitted by TCP and both of these reduce the threshold used to select between Slow Start and Congestion Avoidance. The other end can indicate lost packets by acknowledging the same segment three times. Secondly, during a connection TCP uses the segment's round trip time to calculate a timeout within which acknowledgements are expected. If an acknowledgement is not received in this time then the packet is retransmitted and the congestion window reset so that Slow Start is used.

Figure 7:
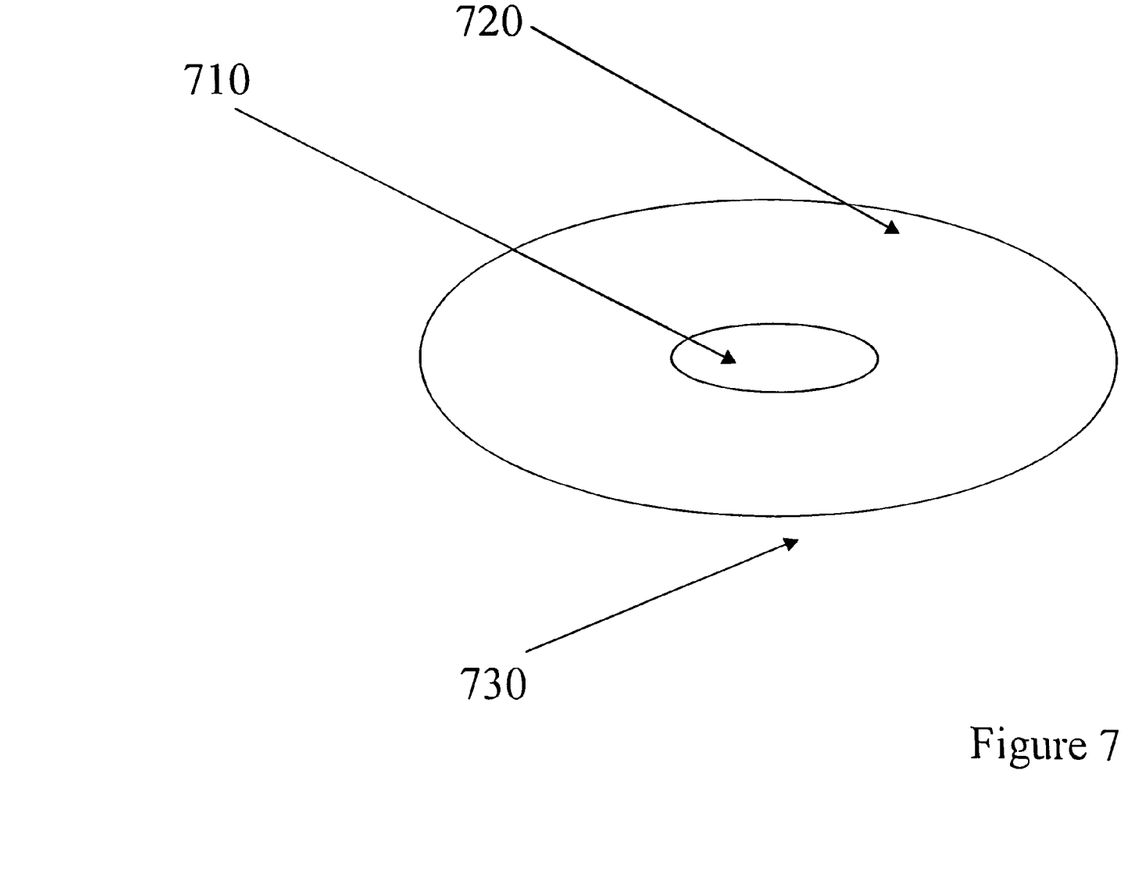
FIG. 7 a communications network according to the present invention formed from a number of subnetworks.

FIG. 7 shows a tiered network 700 according to the present invention, the network allowing mobile terminals to connect to as many of the different subnetworks as are available to the mobile terminal, and the network performing vertical handovers when a mobile terminal enters or leaves the area covered by one of the subnetworks. Subnetwork 710 is Ethernet, providing 10 Mbit/s to fixed locations, subnetwork 720 is Breezenet, which is a 1 Mbps wireless LAN with a coverage of up to 100 meters, and subnetwork 730 is GSM. Although the present invention has so far been referred to in connection with mobile networks, it is equally applicable to hybrid fixed-mobile networks.

A mobile terminal, home agent and an FTP server were connected to the IP based network 700. The mobile terminal was connected to the network using two of the three different subnetworks. A large file was downloaded using FTP from the FTP server onto the mobile terminal and during the file transfer two handovers took place. A packet capture program was used at both the Home Agent and the Mobile Terminal to record the data transfers and the 'tcptrace' program (from http://jarok.cs.ohiou.edu/software/tcptrace, made available by Shawn Ostermann) was used to analyse the data.

Figure 8:
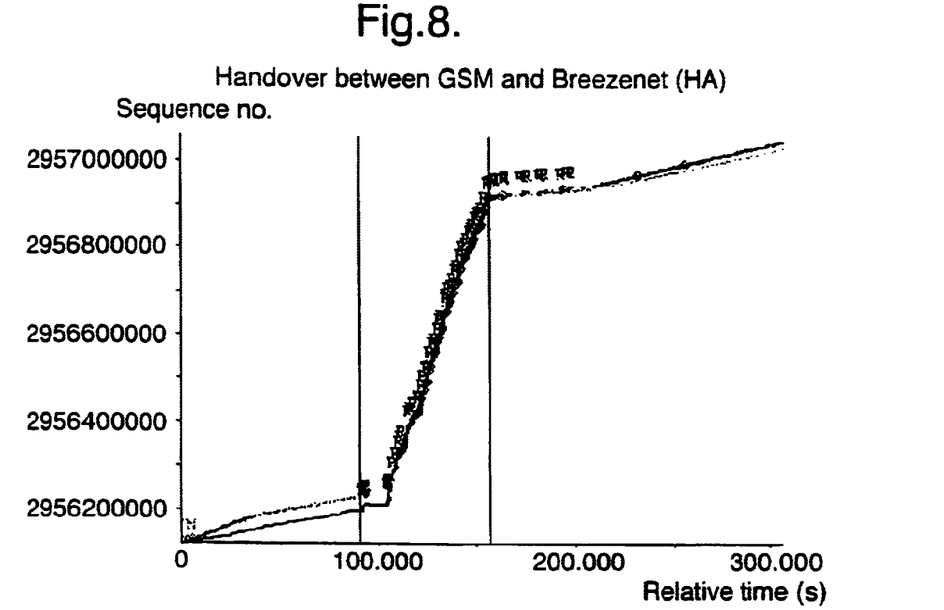
FIG. 8 shows the transmission performance achieved when switching from GSM to Breezenet to GSM at the Home Agent.
Figure 9:
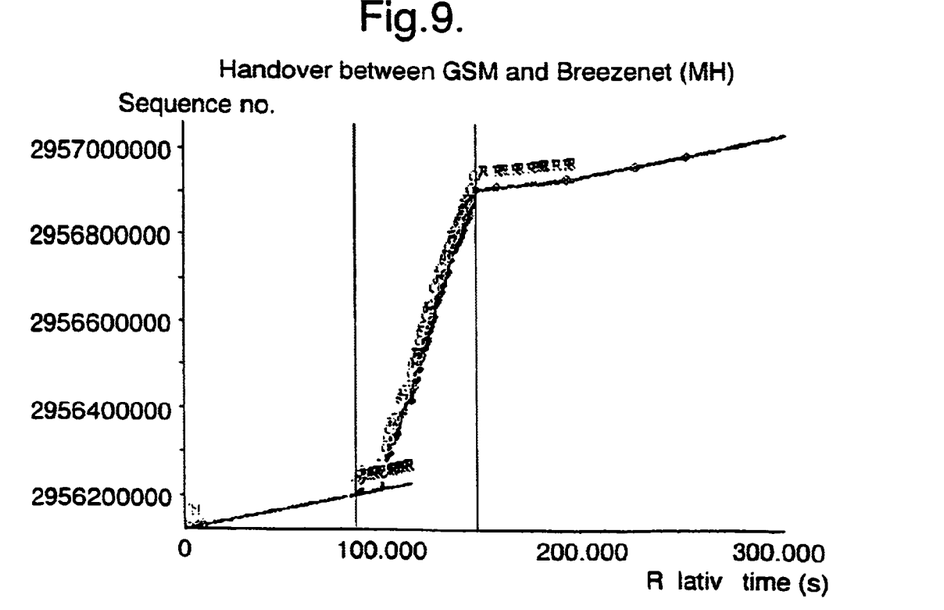
FIG. 9 shows the transmission performance achieved when switching from GSM to Breezenet to GSM at the Mobile Terminal.
Figure 10:
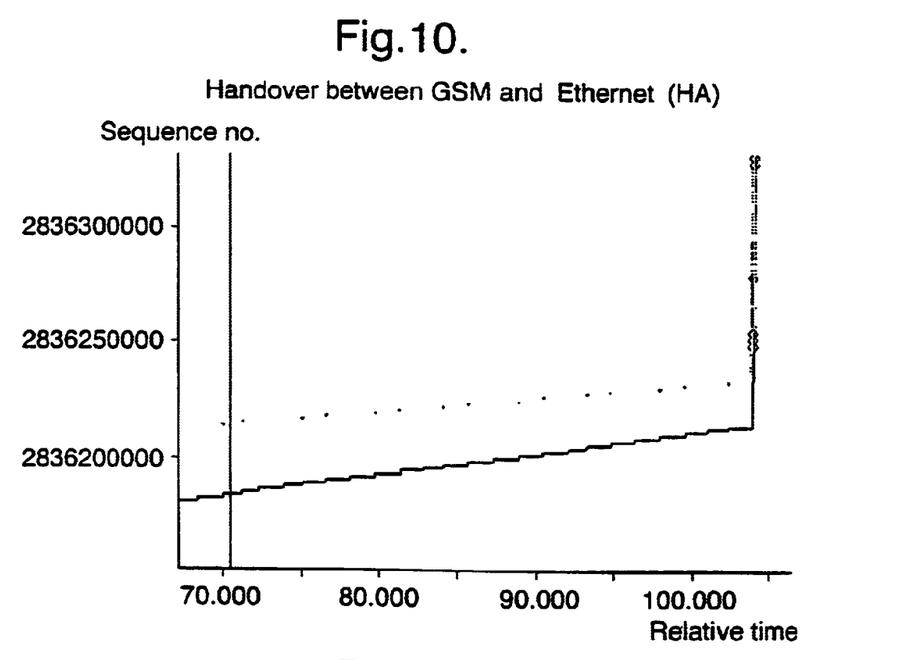
FIG. 10 shows the transmission performance achieved when switching from GSM to Ethernet at the Home Agent.
Figure 11:
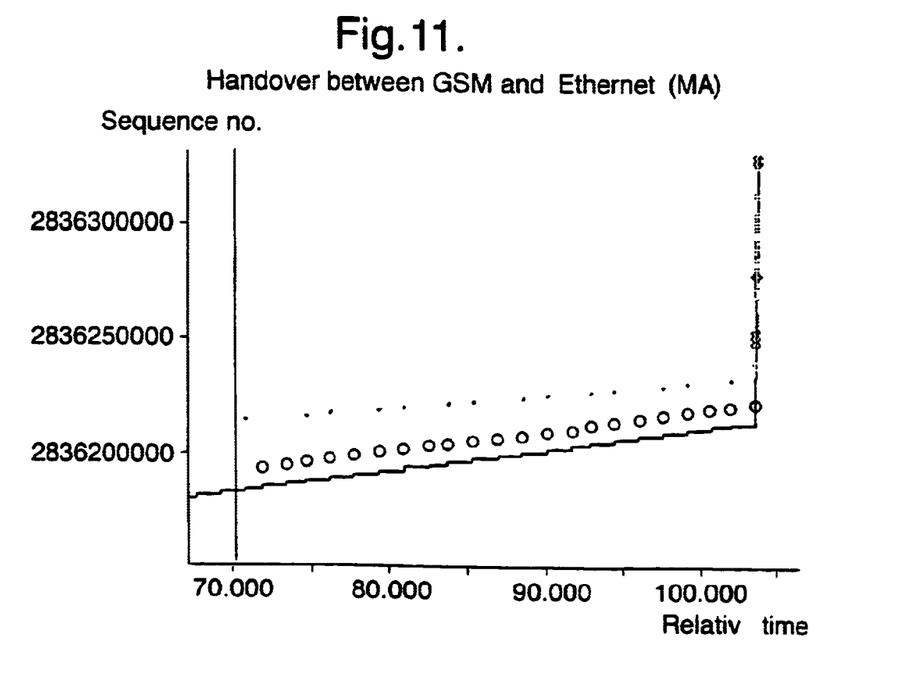
FIG. 11 shows the transmission performance achieved when switching from GSM to Ethernet at the Mobile Terminal.

FIGS. 8 to 15 show the time sequence graphs for the handovers between the different combinations of networks at both the home agent and the mobile terminal. The combination of networks switched between, and the analysis location are listed below;

| FIG. 8 | GSM to Breezenet to GSM | Home Agent |
| FIG. 9 | GSM to Breezenet to GSM | Mobile Terminal |
| FIG. 10 | GSM to Ethernet to GSM | Home Agent |
| FIG. 11 | GSM to Ethernet to GSM | Mobile Terminal |

Figure 12:
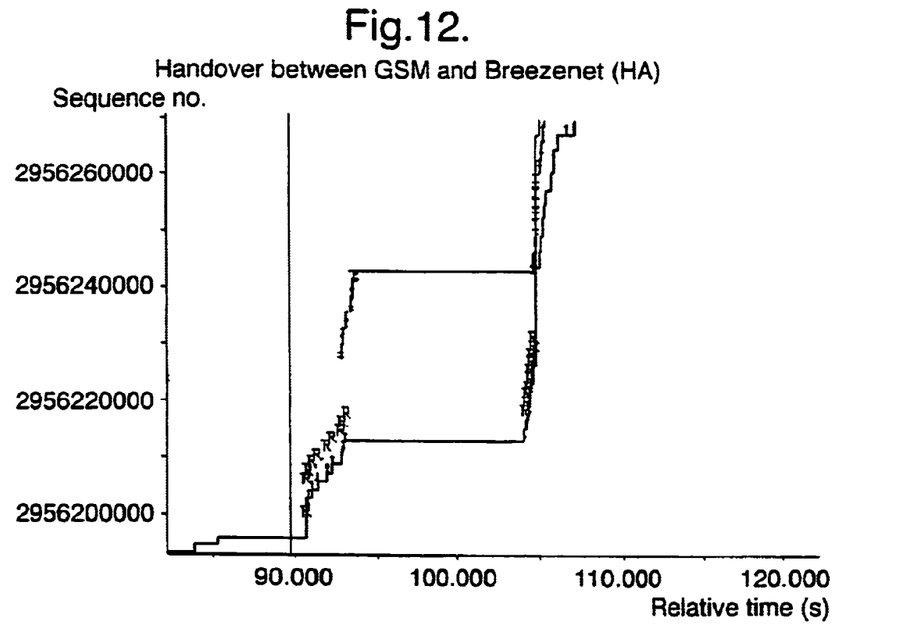
FIG. 12 shows the transmission performance achieved when switching from GSM to Breezenet to GSM at the Home Agent.
Figure 13:
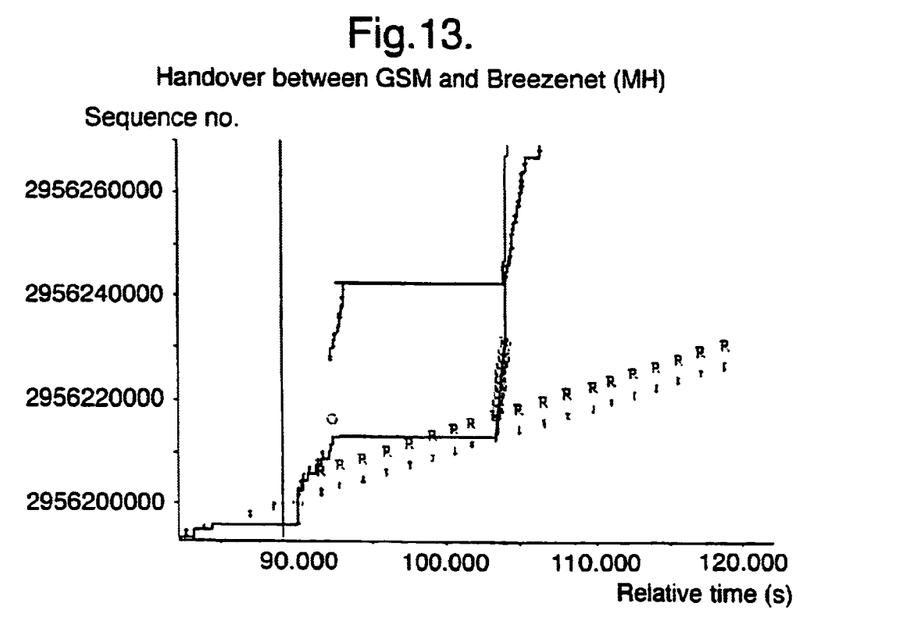
FIG. 13 shows the transmission performance achieved when switching from GSM to Breezenet to GSM at the Mobile Terminal.
Figure 14:
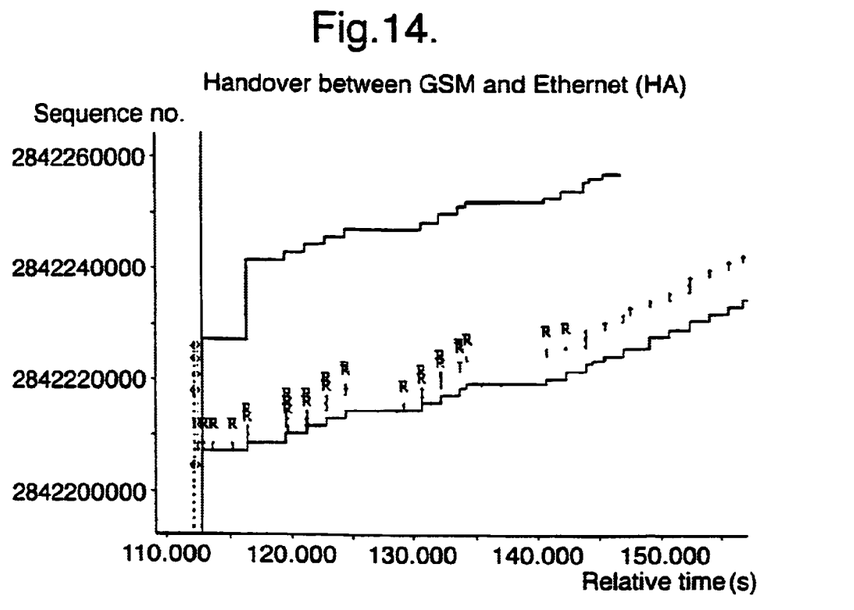
FIG. 14 shows the transmission performance achieved when switching from Ethernet to GSM at the Home Agent.
Figure 15:
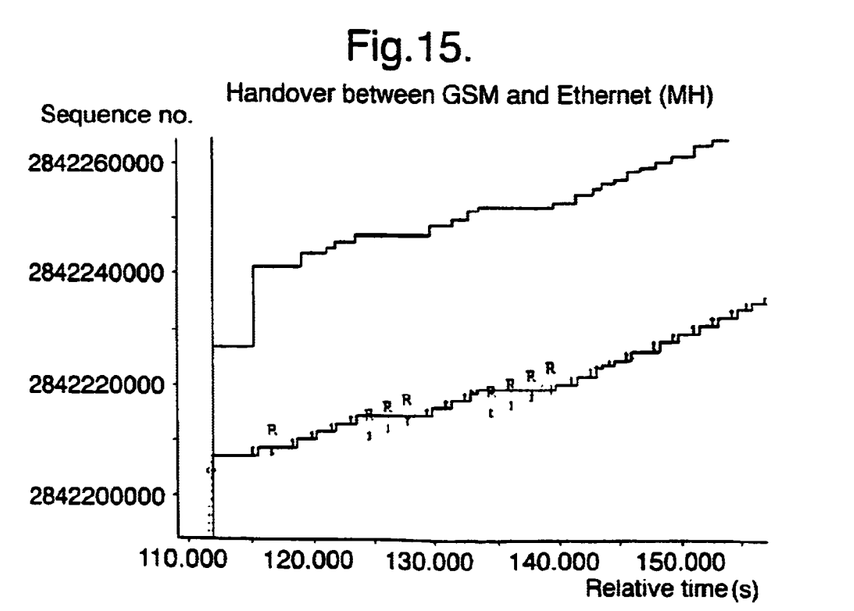
FIG. 15 shows the transmission performance achieved when switching from Ethernet to GSM at the Mobile Terminal.

| | | |
|---|---|---|
| FIG. 12 | GSM to Breezenet to GSM | Home Agent |
| FIG. 13 | GSM to Breezenet to GSM | Mobile Terminal |
| FIG. 14 | Ethernet to GSM | Home Agent |
| FIG. 15 | Ethernet to GSM | Mobile Terminal |

The x-axis of each graph shows time relative to the connection start and the y-axis of each graph shows the TCP sequence number, which is an indication f the number of bytes transmitted. The gradient of the time to sequence numb r characteristic is an indication of the bitrate (in bytes/second) obtained over the network. The vertical lines show when the mobile terminal sent a Mobile IP registration request to the home agent. On these graphs, retransmitted segments are labelled with a 'R' and out of order packets labelled with an 'O'. In some instances, the number of re-transmissions, or packets received in the wrong order, have caused such a number of symbols to be generated that a little clarity is lost in the graph. To explain the effects of handover on TCP performance, some of the graphs show the effect of a handover in more detail.

FIGS. 8 and 9 show the situation that typically occurs during handover from a slow (here GSM) network to a fast (BreezeNet) network (this is the typical situation when walking into a micro or pico cell) and then back again (i.e. leaving a micro or pico cell). After the handover has been initiated, both networks are able to receive packets. FIG. 8 shows the packets at the home agent and FIG. 9 shows the packets received by the mobile terminal. The graph clearly shows the lower bitrate possible over GSM compared to BreezeNet (i.e. the lesser gradient of the trace in the GSM regions of the graph). FIG. 8 shows significant numbers of packet retransmissions at the home agent in the period between the two handovers and just after the handover back to the GSM. FIG. 9 shows significant numbers of disordered packets at the mobile terminal in the period between the two handovers and just after the handover back to the GSM as well as significant numbers of retransmissions just after each handover.

FIGS. 10 & 11 show the handover between GSM and Ethernet (these graphs showing only a single handover from GSM to Ethernet, with no return to Ethernet) and two factors seem to affect the handover performance. Before the handover occurred, many packets were "in flight" between the home agent and the mobile terminal via GSM. Following the handover, it takes about 30 seconds for the in flight packets to be delivered over GSM. At the moment we believe that this may be because of buffering or the bandwidth-delay product of GSM although this point must be clarified. During these 30 seconds, segments have started to be delivered over the Ethernet network. As the packets received over Ethernet are delivered much quicker than those over GSM, the GSM packets arrive out of order (not in the correct sequence). During this time, the congestion window can only increase at the rate which packets are delivered over GSM because the congestion window is only increased when segments are acknowledged. After all the packets hay been delivered over GSM, the congestion window increases more rapidly because the round trip time of the packets has now reduced and the Ethernet speed is reached.

The handover between GSM and BreezeNet shown in FIGS. 12 and 13 demonstrates what happens when packets are lost just before the handover is initiated. In this example, a lost packet caused retransmission due to duplicate acknowledgements from the mobile terminal. The retransmitted packets are sent via Breezenet and are acknowledged before the "in flight" packets arrive over GSM. This causes an increase in the congestion window size and allows new segments to be transmitted over BreezeNet. During this time the originally transmitted segments arrive over GSM at the mobile terminal and can be seen as retransmissions in FIG. 13. TCP recovers from the handover more quickly because it does not have to wait until all the segments are received over GSM.

FIGS. 14 and 15 show the effects of handover from the fast to the slower network. (i.e. when a mobile terminal moves out of range of a micro or pico cell and handover is required to the macro cell). For the scenarios recorded in FIGS. 14 & 15, the Mobile IP registration packet is sent when the mobile terminal detects the loss of the high bandwidth network. Comparing FIGS. 14 and 15, which show the handover from Ethernet to GSM, we can see that the packets in flight on Ethernet are lost because the Ethernet connection is disabled. In FIG. 14 it can be seen that retransmissions of the lost packets occur quickly. The retransmissions are caused by packet timeout, and not by duplicate acknowledgements. Any retransmissions due to timeout causes Slow Start to be initiated (the slow start threshold is set to half the current window size and the congestion window is set to one). Since GSM does not have the same amount of bandwidth as Ethernet, further retransmissions occur because of timeout as the timeout threshold is still the one measured on Ethernet. At the end of all the retransmissions, the slow start threshold will be equal to one. This means that when new segments are exchanged, Slow Start will not be used as the congestion window will be greater than the slow start threshold. This will effect the TCP connection for a long time after the handover because the increase in the congestion window will be slow (especially as the round trip time for the network is long). SACK (Selective acknowledgements) can be used by the TCP receiving end to request that specific segments be retransmitted. This can be used to improve TCP performance over lossy networks and thus it is expected that using SACK will be beneficial following handover from a high bandwidth to a low bandwidth network.

What is claimed is:

1. A method of transmitting one or more data streams to a mobile terminal configured for simultaneous communication via a plurality of types of wireless networks, the method comprising:
   (i) sending the one or more data streams from a correspondent host to a home agent located in the home network of the mobile terminal, the mobile terminal sending a request for a data stream to be transmitted by the correspondent host and the mobile terminal communicating with the home agent to transmit a network location of the mobile terminal to the home agent; and
   (ii) forwarding the one or more data streams to the mobile terminal,
   wherein the mobile terminal sends to the home agent information about the types of networks to which the mobile terminal is currently connected, the available bandwidth for each type of network to which the mobile terminal is currently connected, and the mobile terminal's care-of address applicable for each type of network to which the mobile terminal is currently connected, the home agent selecting an appropriate network and its applicable care-of address based on the available bandwidth for each type of network to which the mobile terminal is currently connected.

2. The method of transmitting one or more data streams to the mobile terminal as in claim 1, wherein in response to a change in the information about the type of network to which the mobile terminal is currently connected received by the home agent at least one of the data streams is forwarded by the home agent to a network cache, said at least one of the data streams being stored in the network cache until the home agent forwards said at least one of the data streams to the mobile terminal.

3. The method of transmitting one or more data streams to the mobile terminal as in claim 1, wherein the request sent by the mobile terminal to the correspondent host is sent via the home agent.

4. The method of transmitting one or more data streams to the mobile terminal as in claim 1, wherein all communication from the home agent to the mobile terminal is routed via a foreign agent, the foreign agent being located in a subnetwork to which the mobile terminal is connected.

5. The method of transmitting one or more data streams to the mobile terminal as in claim 1, wherein all communication from the mobile terminal to the home agent is routed via a foreign agent, the foreign agent being located in a subnetwork to which the mobile terminal is connected.

6. The method of transmitting one or more data streams to the mobile terminal as in claim 1, wherein in response to a change in the information about the type of network to which the mobile terminal is currently connected received by the home agent the information content of at least one of the data streams is reduced before being forwarded to the mobile terminal.

7. The method of transmitting one or more data streams to the mobile terminal as in claim 6, wherein the reduction of information content of the at least one of the data streams comprises the conversion from a first data format to a second data format having a lower resolution than the first data format.

8. The method as in claim 1, wherein the home agent selects an appropriate network and its applicable care-of address by comparing the bandwidths of the different types of networks to which the mobile terminal is selected.

9. A mobile communications terminal comprising:
   an interface configured for simultaneous communication via a plurality of types of wireless communications networks;
   means for transmitting and receiving data using one or more network interfaces;
   control means operative to send messages by way of the interface to a home agent about the types of networks to which the mobile terminal is currently connected, the available bandwidth for each type of network to which the mobile terminal is currently connected, and the mobile terminal's care-of address applicable for each type of network to which the mobile terminal is connected; and
   means responsive to the home agent which selects a wireless communications network on which to transmit and receive data and its applicable care-of address based on the available bandwidth for each type of network to which the mobile terminal is currently connected.

10. The mobile communications terminal as in claim 9, wherein the home agent selects an appropriate network and its applicable care-of address by comparing the bandwidths of the different types of networks to which the mobile terminal is selected.

11. A communications network comprising:
    a plurality of mobile communications subnetworks, some of said mobile communications subnetworks having overlapping geographical coverage; and
    a home agent operative such that an associated mobile terminal can be in simultaneous communication with more than one of the plurality of mobile communications subnetworks;
    wherein the home agent comprises a receiver for receiving from the mobile terminal information relating to the types of subnetworks to which the mobile terminal is currently connected, the available bandwidth for each type of subnetwork to which the mobile terminal is currently connected, and the mobile terminal's care-of address applicable for each type of subnetwork to which the mobile terminal is currently connected, the home agent selecting an appropriate subnetwork and its applicable care-of address based on the available bandwidth for each type of subnetwork to which the mobile terminal is currently connected.

12. The communications network as in claim 11, wherein the home agent selects an appropriate network and its applicable care-of address by comparing the bandwidths of the different types of networks to which the mobile terminal is selected.

13. A non-transitory storage medium readable by a computer, tangibly embodying a program of instructions executable by the computer to perform a method of transmitting one or more data streams to a mobile terminal configured for simultaneous communication via a plurality of types of wireless communication channels, the method comprising:
    (i) sending the one or more data streams from a correspondent host to a home agent located in a home network of the mobile terminal, the mobile terminal sending a request for the one or more data streams to be transmitted by the correspondent host and the mobile terminal communicating with the home agent to transmit the network location of the mobile terminal to the home agent; and
    (ii) forwarding the one or more data streams to the mobile terminal,
    wherein the mobile terminal sends to the home agent information about the types of different communications channels to which the mobile terminal is currently connected, the available bandwidth for each type of communications channel to which the mobile terminal is currently connected, and the mobile terminal's care-of address applicable for each type of communications channel to which the mobile terminal is currently connected, the home agent selecting an appropriate communications channel and its applicable care-of address based on the available bandwidth for each type of communications channel to which the mobile terminal is currently connected.

14. The non-transitory storage medium as in claim 13, wherein the home agent selects an appropriate communications channel and its applicable care-of address by comparing the bandwidths of the different types of communications channel to which the mobile terminal is selected.

* * * * *